United States Patent

Budzynski et al.

[11] Patent Number: 5,556,648
[45] Date of Patent: Sep. 17, 1996

[54] QUICK BOTTLE PRODUCTION CHANGEOVER UTILIZING MULTI-CAVITY MOLDS IN AN EXTRUSION BLOW MOLDING SYSTEM

[75] Inventors: Danny L. Budzynski, Dublin; Gary S. Bliss, Beavercreek, both of Ohio

[73] Assignee: Dowbrands Inc., Indianapolis, Ind.

[21] Appl. No.: 259,025

[22] Filed: Jun. 13, 1994

Related U.S. Application Data

[63] Continuation-in-part of Ser. No. 80,456, Jun. 18, 1993, Pat. No. 5,433,916.

[51] Int. Cl.$^6$ .................................................. B29C 49/78
[52] U.S. Cl. .................... 425/150; 264/530; 264/540; 264/543; 425/531; 425/532; 425/540
[58] Field of Search ........................ 425/532, 540, 425/192 R, 190, 150, 171, 527, 531; 264/540, 543, 530

[56] References Cited

U.S. PATENT DOCUMENTS

| | | | |
|---|---|---|---|
| 3,355,763 | 12/1967 | Willert | 425/532 |
| 3,399,424 | 9/1968 | Sheptak | 425/156 |
| 3,464,091 | 9/1969 | Bielfeldt | 425/574 |
| 3,640,661 | 2/1972 | Gasior et al. | 425/159 |
| 3,802,823 | 4/1974 | Doughty et al. | 425/532 |
| 3,854,855 | 12/1974 | Pollock et al. | 425/142 |
| 4,090,836 | 5/1978 | van der Ohe et al. | 425/574 |
| 4,362,688 | 12/1982 | Nakagawa | 425/532 X |
| 4,560,340 | 12/1985 | Younkin et al. | 264/543 X |
| 4,674,969 | 6/1987 | Korn | 425/540 X |
| 4,854,848 | 8/1989 | Krall et al. | 425/532 X |
| 4,861,542 | 8/1989 | Oles et al. | 264/542 |
| 5,073,617 | 12/1991 | Jorge et al. | 264/564 X |
| 5,118,460 | 6/1992 | Bydmann | 264/527 X |
| 5,208,049 | 5/1993 | Hatfield et al. | 425/190 X |

FOREIGN PATENT DOCUMENTS

| | | |
|---|---|---|
| 0048113 | 3/1982 | European Pat. Off. |
| 0143278 | 6/1985 | European Pat. Off. |
| 0405536 | 1/1991 | European Pat. Off. |
| 4515144 | 5/1970 | Japan . |
| 245914 | 9/1993 | Japan . |
| 2255929 | 11/1992 | United Kingdom . |

*Primary Examiner*—Richard L. Chiesa

[57] ABSTRACT

A blow molding apparatus is provided including a blow mold, an extrusion apparatus, a locator mechanism, and a blow pin. The blow mold has first and second blow mold halves which are engageable and disengageable with one another. The first and second blow mold halves define first and second inner cavities when the mold halves are engaged. The first cavity has a first shape and the second cavity has a second shape which differs from the first shape. The extrusion apparatus has a die head through which a parison is extruded. The locator mechanism is associated with one of the blow mold and the extrusion apparatus for changing the positioning between the blow mold and the die head to allow capture of an extruded parison by the first and second mold halves within a desired one of the first and second inner cavities such that the extruded parison can be formed into an article having substantially the same shape as the desired cavity. The blow pin is associated with one of the first and second mold halves for passing pressurized fluid into the interior of the parison to blow the parison against the first and second mold halves to form the article.

13 Claims, 8 Drawing Sheets

QUICK BOTTLE PRODUCTION CHANGEOVER UTILIZING MULTI-CAVITY MOLDS IN AN EXTRUSION BLOW MOLDING SYSTEM

CROSS-REFERENCE TO RELATED APPLICATION

This application is a continuation-in-part of U.S. patent application Ser. No. 08/080,456, filed Jun. 18, 1993, now U.S. Pat. No. 5,433,916 the disclosure of which is hereby incorporated by reference.

BACKGROUND OF THE INVENTION

1. Field of Invention

This invention is directed to a blow molding apparatus and a method for blow molding articles utilizing multi-cavity molds secured to a rotatable blow molder wheel. The multi-cavity molds provide the rotatable blow molder wheel with the capability to produce bottles having different shapes. A changeover from a first bottle design to a second bottle design can be effected by changing the positioning between a die head of an extrusion apparatus and the blow molder wheel.

2. Description of the Prior Art

Rotating blow molder wheels of conventional blow molding machines are typically provided with single cavity blow molds which are capable of producing bottles of only a single design. The downtime required to change blow molder wheels, blow molds or other equipment in conventional blow molding machines in order to use the same extrusion system to produce a different bottle design is quite costly. Hence, these blow molding machines have been found to be disadvantageous.

Another prior art blow molding machine utilizes a rotating blow molder wheel having blow molds with multiple cavities, each of the same shape. If a changeover from a first bottle design to a second bottle design is required, the blow molds and, possibly, other equipment, must be changed. This kind of equipment changeover is costly due to, among other things, production line downtime and the need to have on hand separate blow molds for each bottle design.

Accordingly, there is a need for an improved method and apparatus for blow molding articles such that costly equipment changeover is not required when it is desired to produce a different bottle design with the same extrusion apparatus.

SUMMARY OF THE INVENTION

This need is met by the present invention wherein an improved blow molding apparatus is provided which permits bottle design changeover to take place without the need for costly manufacturing equipment changeover.

In accordance with a first aspect of the present invention, a blow mold is provided which is adapted to receive a parison of polymeric material to be blow molded into an article. The blow mold comprises first and second blow mold halves which are engageable and disengageable with one another. The first and second blow mold halves define first and second inner cavities when the mold halves are engaged. The first cavity has a first shape and the second cavity has a second shape which differs from the first shape. The first cavity is adapted to receive a parison to be formed into a first article having substantially the first shape and the second cavity is adapted to receive a parison to be formed into a second article having substantially the second shape. The blow mold may also define additional inner cavities. The blow mold halves have opposing portions which engage and clamp off a portion of the captured parison when the mold halves are engaged.

In accordance with a second aspect of the present invention, a blow molding apparatus is provided comprising a blow mold, first and second displacement mechanisms, an extrusion apparatus, a locator mechanism, and a blow pin. The blow mold has first and second blow mold halves which are engageable and disengageable with one another. The first and second blow mold halves define first and second inner cavities when the mold halves are engaged. The first cavity has a first shape and the second cavity has a second shape which differs from the first shape. The first and second displacement mechanisms are connected respectively to the first and second mold halves for moving the first and second mold halves into and out of engagement with one another. The extrusion apparatus has a die head through which a parison is extruded. The locator mechanism is associated with one of the blow mold and the extrusion apparatus for changing the positioning between the blow mold and the die head to allow capture of an extruded parison by the blow mold within a desired one of the first and second inner cavities such that the extruded parison can be formed into an article having substantially the same shape as the desired one cavity. The blow pin extends through one of the first and second mold halves for passing pressurized fluid into the interior of the parison to blow the parison against the first and second mold halves to form the article.

In accordance with a first embodiment of the present invention, the locator mechanism is connected to the extrusion apparatus for moving the extrusion apparatus and the die head relative to the blow mold. The locator mechanism may comprise a motor-driven screw mechanism. In accordance with a second embodiment of the present invention, the locator mechanism is connected to the blow mold for moving the blow mold relative to the die head.

The apparatus may also include a sensor for determining when the die head is positioned adjacent to one of first and second locations on the blow mold. The blow mold captures an extruded parison within the first cavity when the die head is positioned adjacent to the first location and captures an extruded parison within the second cavity when the die head is positioned adjacent to the second location. The sensor may comprise a position encoder.

In accordance with a third aspect of the present invention, a blow molding apparatus is provided comprising a rotating blow molder wheel, an extrusion apparatus, a locator mechanism, and a blow pin. The blow molder wheel has a plurality of blow molds. Each blow mold includes first and second blow mold halves which are engageable and disengageable with one another. The first and second blow mold halves define first and second inner cavities when the mold halves are engaged. The first cavity has a first shape and the second cavity has a second shape which differs from the first shape. The extrusion apparatus has a die head for extruding a parison. The locator mechanism is associated with one of the blow molder wheel and the extrusion apparatus for changing the positioning between the blow molder wheel and the die head to permit one of the blow molds to capture an extruded parison within a desired one of its first and second inner cavities such that the extruded parison can be formed into an article having substantially the same shape as the one cavity. The blow pin extends through an orifice in the one blow mold for passing pressurized fluid into the interior of the extruded parison to blow the parison against the first and second mold halves of the one blow mold to form the article.

In accordance with a fourth aspect of the present invention, a method is provided for blow molding first and second articles, each having a different shape. The method includes the step of providing a blow mold including first and second blow mold halves which are engageable and disengageable with one another. The first and second blow mold halves define first and second inner cavities when the mold halves are engaged. The first cavity has a first shape and the second cavity has a second shape which differs from the first shape. The method further comprises the steps of: providing an extrusion apparatus including a die head through which a parison is extruded; positioning the die head adjacent to the blow mold such that a first extruded parison is capable of being received within the first cavity; extruding a first parison; capturing the first parison between the first and second mold halves such that the first parison is received within the first cavity; passing pressurized fluid into the first parison to blow the first parison against the first and second mold halves to form a first article having generally the shape of the first cavity; cooling the blown first parison; releasing the cooled first parison from between the first and second mold halves; repositioning one of the die head and the blow mold such that a second extruded parison is capable of being received within the second cavity; extruding a second parison; capturing the second parison between the first and second mold halves such that the second parison is received within the second cavity; passing pressurized fluid into the second parison to blow the second parison against the first and second mold halves to form a second article having generally the shape of the second cavity; cooling the blown second parison; and releasing the cooled second parison from between the first and second mold halves.

It is an object of the present invention to provide an improved blow mold which includes at least two cavities, each having a different shape. It is a further object of the present invention to provide an improved blow molding apparatus which is capable of producing first and second bottles, each having a different shape. It is a further object of the present invention to provide a method for blow molding first and second articles, each having a different shape. These and other objects and advantages of the present invention will be apparent from the following description, the accompanying drawings, and the appended claims.

DETAILED DESCRIPTION OF THE PREFERRED EMBODIMENTS

Figure 1:
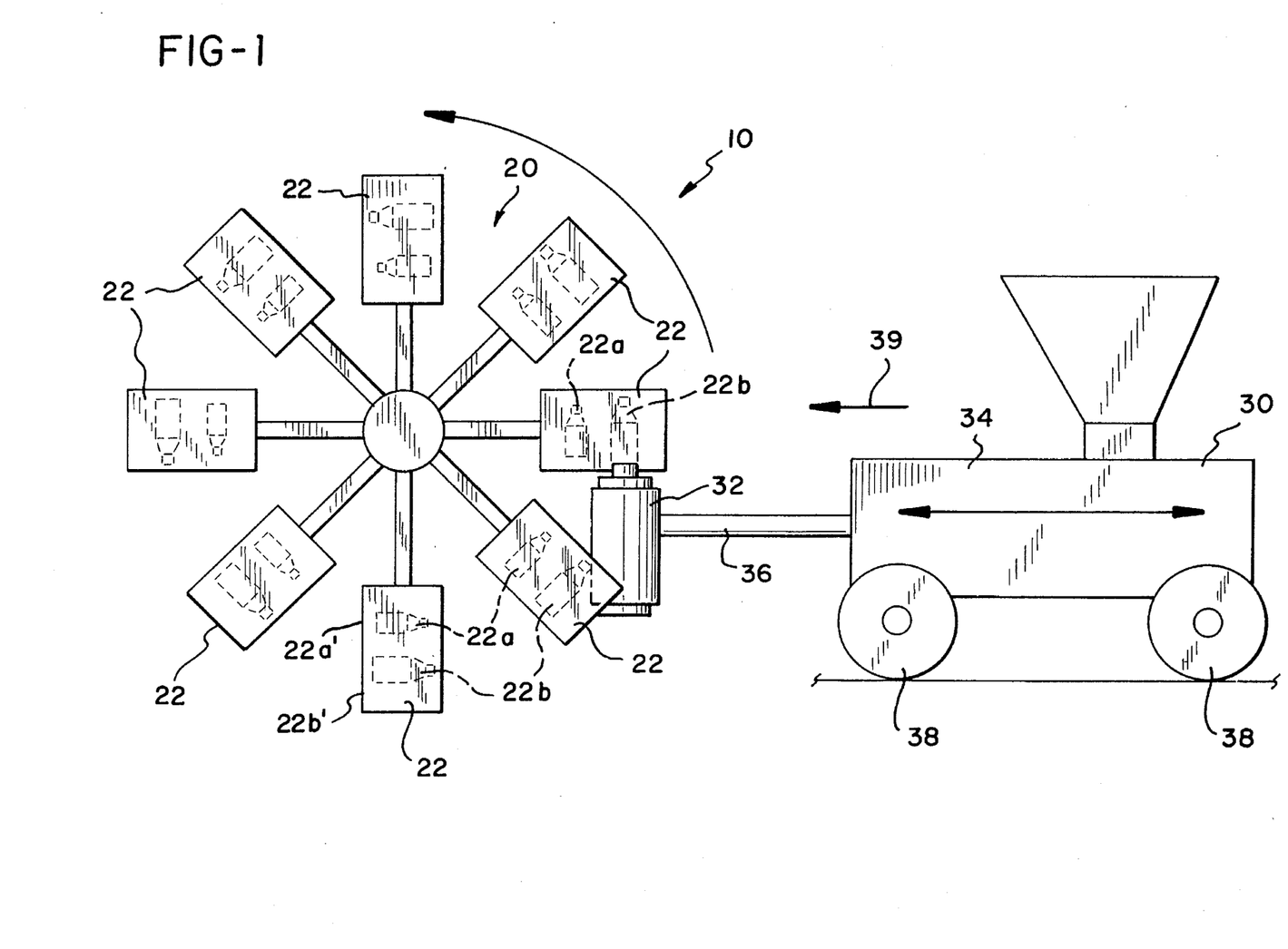
FIG. 1 is a schematic side elevational view of a rotatable blow molder wheel and an extrusion apparatus constructed in accordance with a first embodiment of the present invention.

FIG. 1 shows a blow molding apparatus 10 constructed in accordance with a first embodiment of the present invention. The blow molding apparatus 10 comprises a fixed rotatable blow molder wheel 20 and a movable extrusion apparatus 30. The blow molder wheel 20 comprises a plurality of blow molds 22. Each blow mold 22 includes first and second inner cavities 22a and 22b, each having a different shape.

The extrusion apparatus 30 includes a die head 32 which communicates with an extruder 34 via a melt pipe 36. A parison of polymeric material, such as polyethylene, is extruded through the die head 32. While only a single melt pipe 36 is shown, additional melt pipes may be provided for passing polymeric materials from additional extruders to the die head 32.

In the embodiment illustrated in FIG. 1, the extrusion apparatus 30 is movable via wheels 38. The extrusion apparatus 30 is positioned in FIG. 1 such that a parison (not shown) extruded from the die head 32 is received within the outermost radial cavity 22b of each blow mold 22 as each mold 22 moves past the die head 32 during counterclockwise movement of the blow molder wheel 20. If an article having substantially the same shape as cavity 22a is desired, the extrusion apparatus is moved in a direction, represented by arrow 39, toward the blow molder wheel 20 such that a parison extruded from the die head 32 is received within the innermost radial cavity 22a of a blow mold 22. In the illustrated embodiment, cavity 22a is shaped to form a first article and cavity 22b is shaped to form a second article which has a shape different from that of the first article. It is further contemplated by the present invention that additional cavities (not shown) may be provided within the molds 22.

Figure 2:
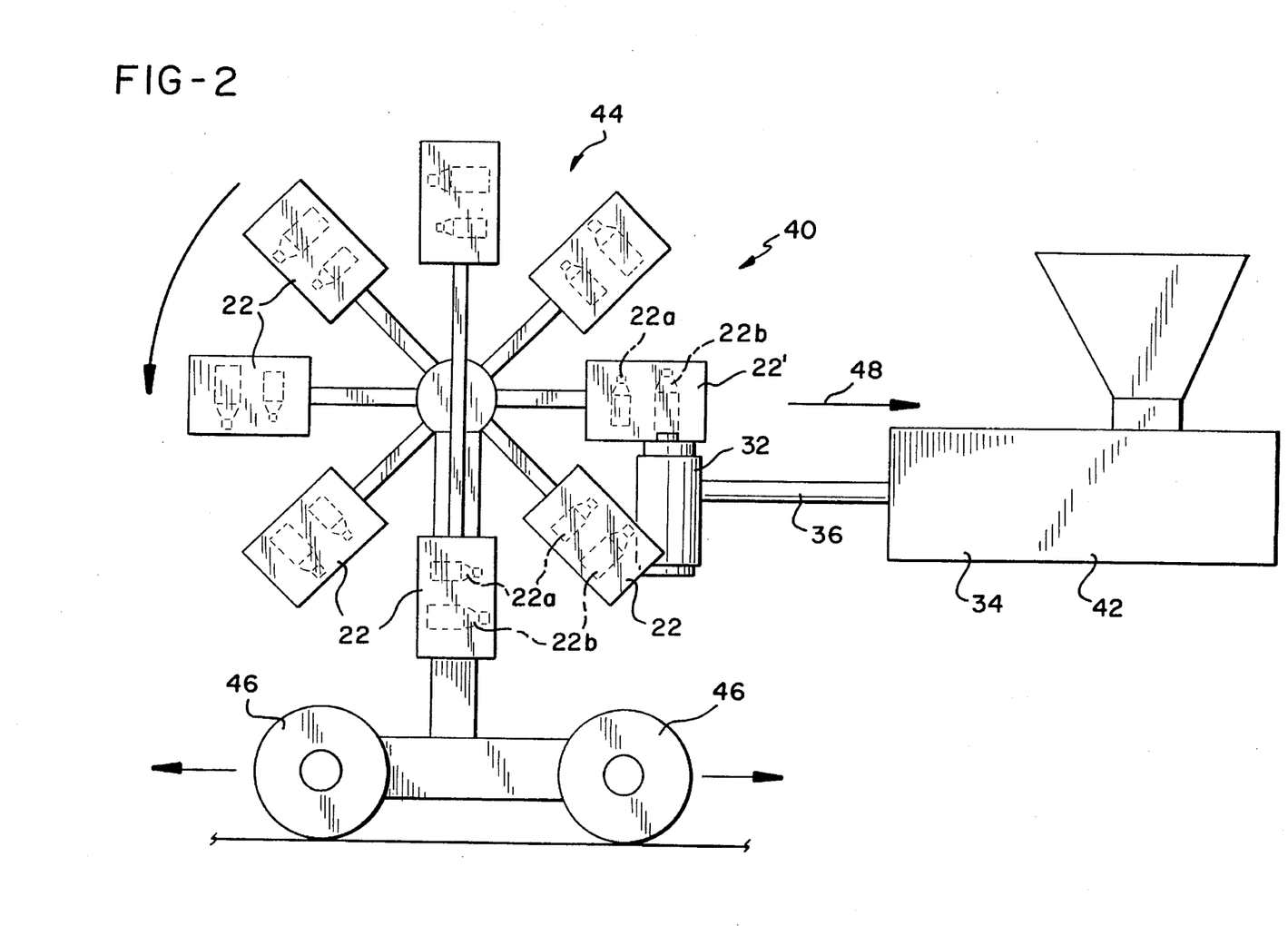
FIG. 2 is a schematic side elevational view of a rotatable blow molder wheel and an extrusion apparatus constructed in accordance with a second embodiment of the present invention.

A blow molding apparatus 40 constructed in accordance with a second embodiment of the present invention, is shown in FIG. 2, where like elements are referenced by like numerals. In this embodiment, the extrusion apparatus 42 is fixed, while the rotatable blow molder wheel 44 is movable via wheels 46. The extrusion apparatus 42 includes a die head 32, an extruder 34, and a melt pipe 36. In FIG. 2, the blow molder wheel 44 is positioned such that a parison (not shown) extruded from the die head 32 is received within the outermost radial cavity 22b of each blow mold 22 as each mold 22 moves past the die head 32. If an article having substantially the same shape as cavity 22a is desired, the blow molder wheel 44 is moved in a direction, represented by arrow 48, toward the extrusion apparatus 42 such that a parison extruded from the die head 32 is received within the innermost radial cavity 22a of a blow mold 22.

Figure 3:
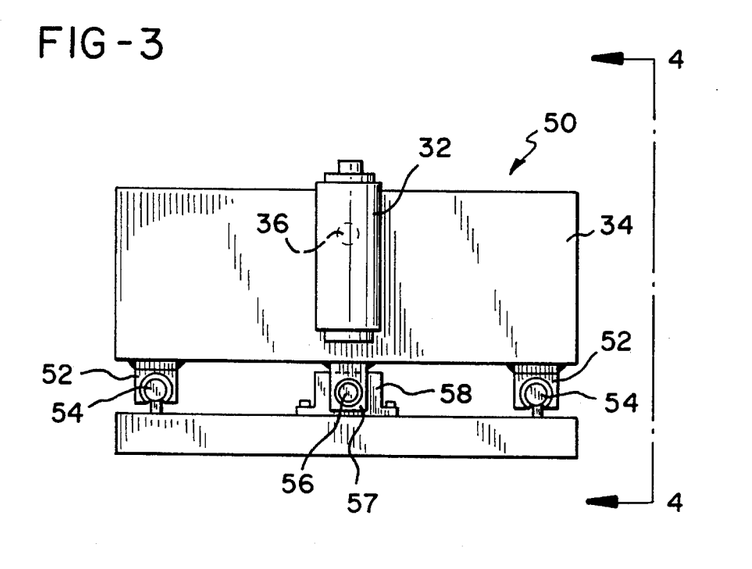
FIG. 3 is a schematic front view of an extrusion apparatus constructed in accordance with a third embodiment of the present invention.
Figure 4:
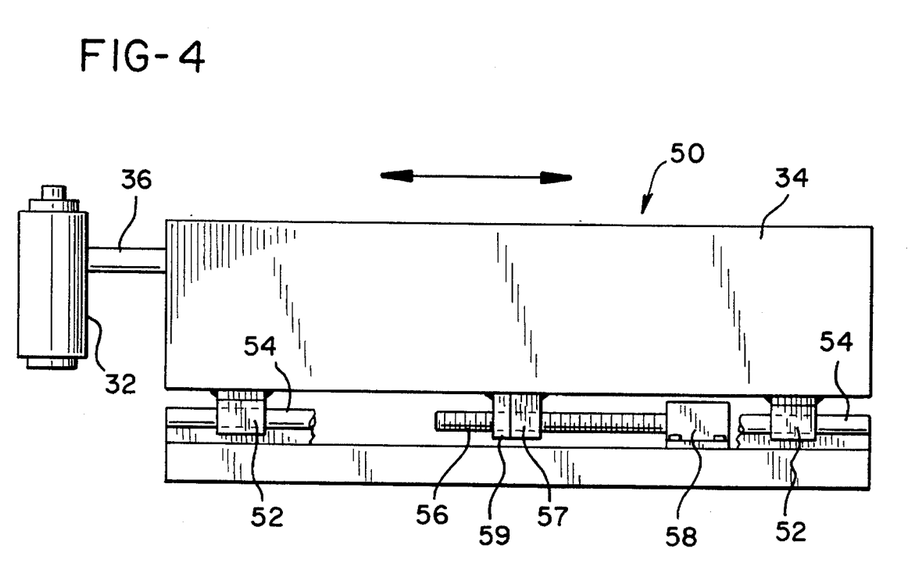
FIG. 4 is a view taken along view line 4—4 in FIG. 3.

An extrusion apparatus 50 constructed in accordance with a third embodiment of the present invention, is shown in FIGS. 3 and 4, where like elements are referenced by like numerals. In this embodiment, the extrusion apparatus 50 includes a die head 32, an extruder 34, and a melt pipe 36. Cylindrical bearing bodies 52 are fixedly connected to the extruder 34 and are linearly moveable on shafts 54. A screw 56 threadedly engages with a nut 57 fixedly connected to the extruder 34. The screw 56 is caused to rotate via a motor 58 to effect linear movement of the extrusion apparatus 50 along the shafts 54. While not shown in FIGS. 3 and 4, a rotatable blow molder wheel 20 is positioned adjacent to the extrusion apparatus 50 in the same manner that the blow molder wheel 20 is positioned adjacent to the extrusion apparatus 30 in FIG. 1. Movement of the extrusion apparatus 50 along the shafts 54 allows the die head 32 to be appropriately positioned with respect to the blow molds 22 on the blow molder wheel 20.

A conventional position encoder sensor 59 is associated with the screw 56 for determining when the die head 32 is correctly positioned adjacent to one of first and second locations 22a' and 22b' on a blow mold 22, see FIG. 1. The blow mold 22 captures an extruded parison within the first cavity 22a when the die head 32 is positioned adjacent to the first location 22a' and captures an extruded parison within the second cavity 22b when the die head 32 is positioned adjacent to the second location 22b'.

Figure 5:
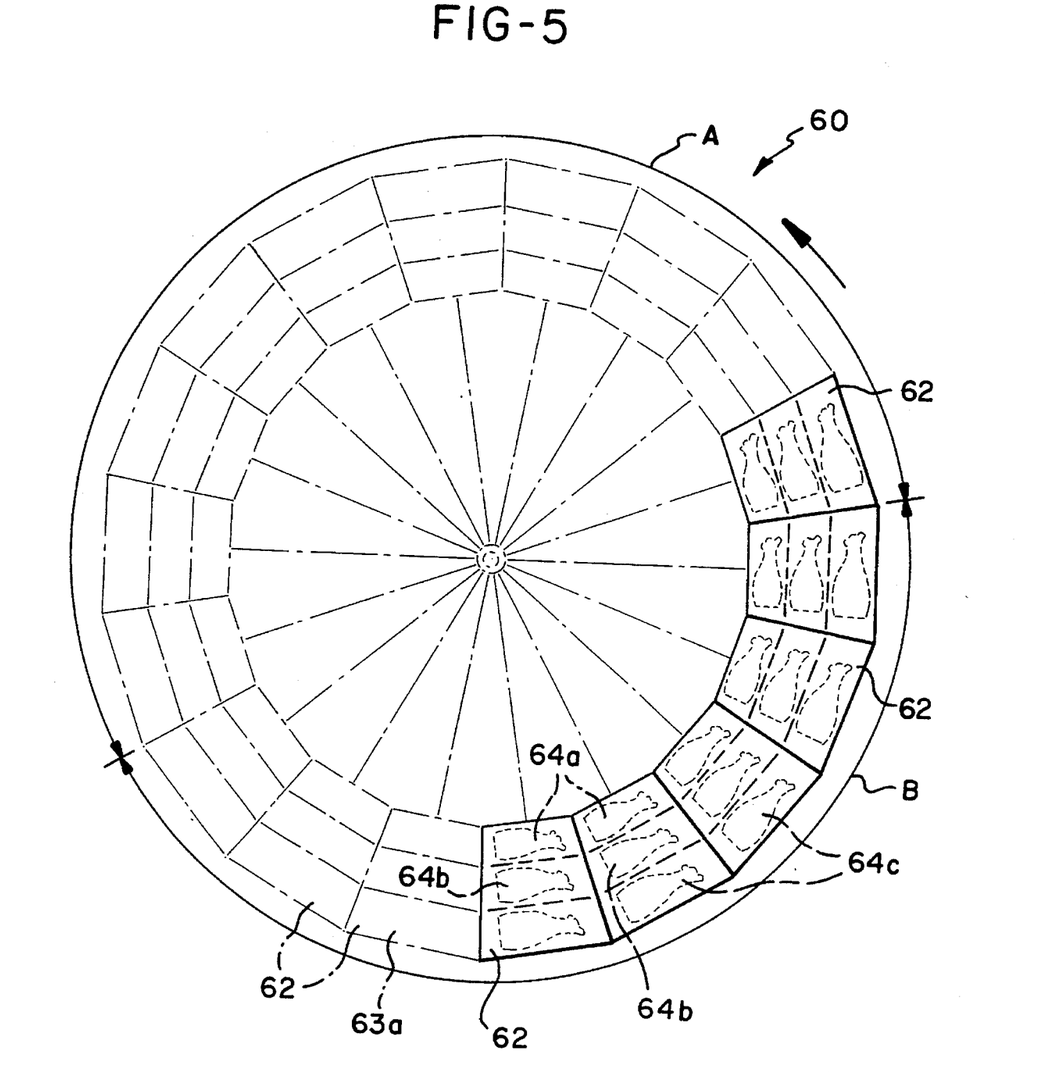
FIG. 5 is a schematic side view of a rotatable blow molder wheel including a plurality of blow molds, each having three inner cavities, with cavities in only a portion of the molds being shown in dotted line.
Figure 6:
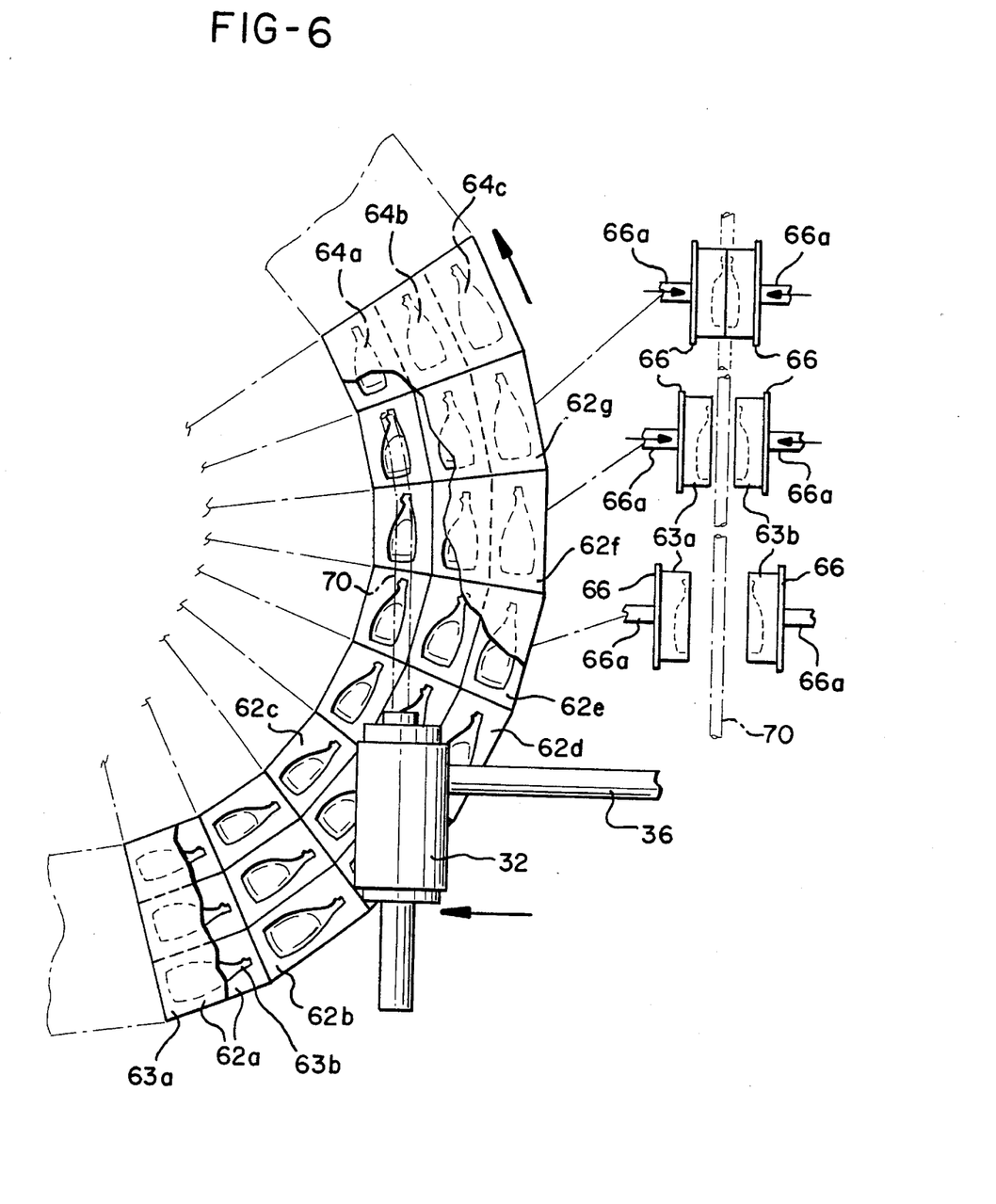
FIG. 6 is a schematic view, partially broken-away, of a portion of a rotatable molder wheel and including a die head positioned adjacent to innermost radial cavities of the blow molds and further illustrating opposing mold halves of three blow molds capturing a parison therebetween.
Figure 7:
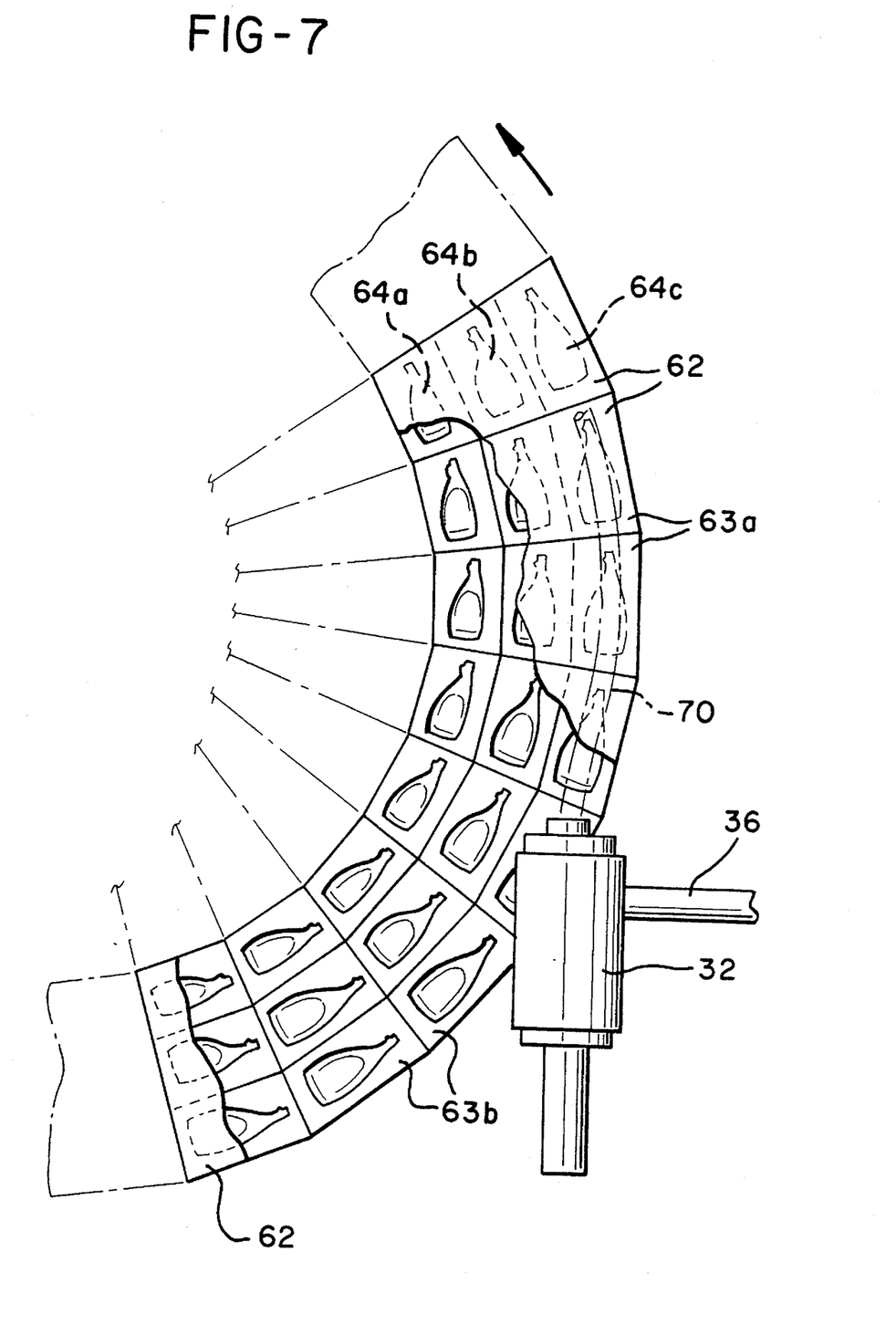
FIG. 7 is a schematic view similar to FIG. 6 with the die head positioned adjacent to outermost radial cavities of the blow molds.

Reference is now made to FIGS. 5–7, where a rotatable blow molder wheel 60 constructed in accordance with a further embodiment of the present invention is shown. The blow molder wheel 60 includes a plurality of blow molds 62, each having first and second mold halves 63a and 63b which are engageable and disengageable with one another, see also FIGS. 8 and 9. The first and second mold halves 63a and 63b define first, second, and third inner cavities 64a–64c when the first and second halves 63a and 63b are engaged. The first, second, and third cavities 64a–64c each have a different shape. The mold halves 63a and 63b are mounted on platens 66 which are movable toward and away from one another by conventional transfer mechanisms, such as pistons 66a, see FIGS. 6 and 8.

Referring now to FIG. 6, as the blow molder wheel 60 rotates in a counterclockwise direction, the first and second mold halves 63a and 63b of blow molds 62a–62e are disengaged with one other to permit them to pass on opposite sides of the die head 32. After each mold 62 moves past the die head 32, its first and second mold halves 63a and 63b are brought into engagement with one another via the pistons 66a to effect the clamping of a parison 70 therebetween. The die head 32 is shown in FIG. 6 positioned such that an extruded parison 70 is received within each of the innermost radial cavities 64a of the molds 62. The die head 32 may be repositioned, as shown in FIG. 7, such that an extruded parison 70 is received within each of the outermost radial cavities 64c of the molds 62. The die head 32 may also be repositioned such that an extruded parison 70 is positioned within each of the centrally located cavities 64b of the molds 62.

Figure 8:
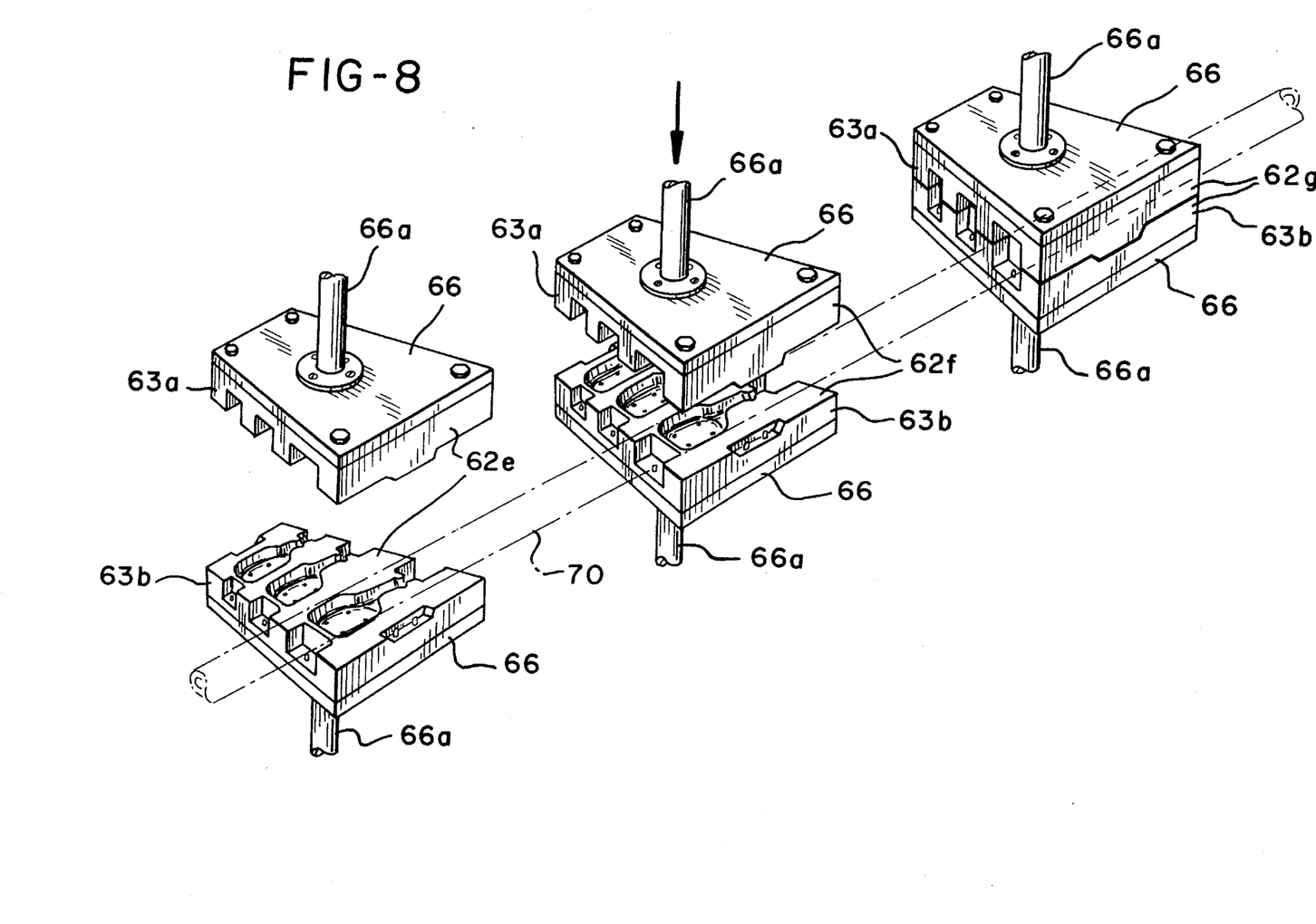
FIG. 8 is a perspective view of opposing mold halves of three blow molds capturing a parison therebetween.

In FIGS. 6 and 8, the mold halves 63a and 63b of the mold 62f are shown moving toward one another to engage the parison 70, while the mold halves 63a and 63b of the mold 62g are shown in engagement with one another with the parison 70 captured therebetween. In the illustrated embodiment, the mold halves 63a and 63b remain in engagement as they travel through arc A and are disengaged from one another as they travel through arc B, see FIG. 5.

Figure 9:
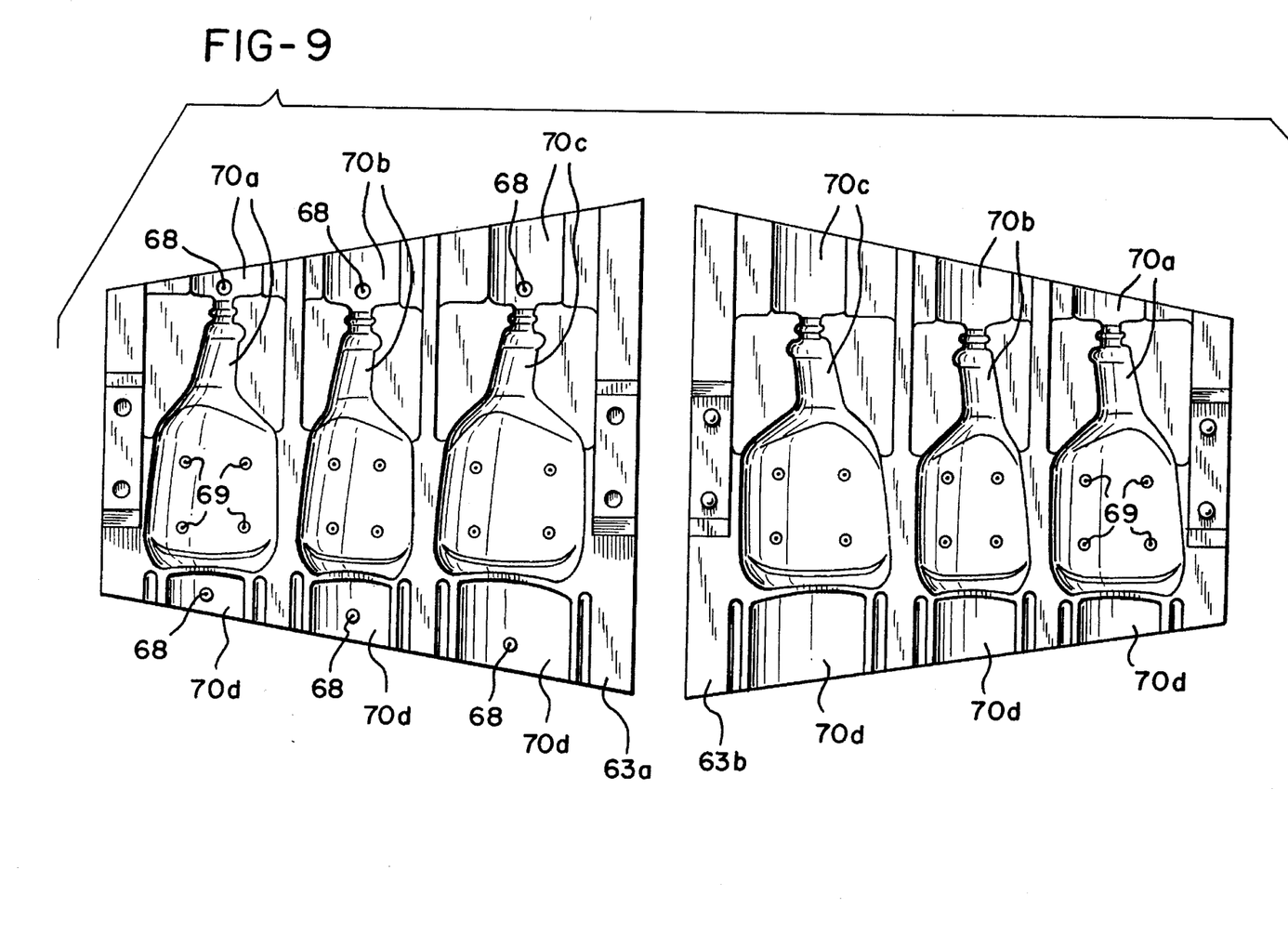
FIG. 9 is a plan view of first and second mold halves of a blow mold.

Each of the mold halves 63a and 63b is formed with first, second and third recesses 70a, 70b and 70c, see FIG. 9. The first recesses 70a define the first cavity 64a when the first and second mold halves 63a and 63b are engaged. The second recesses 70b define the second cavity 64b when the first and second mold halves 63a and 63b are engaged. The third recesses 70c define the third cavity 64c when the first and second mold halves 63a and 63b are engaged. Fourth recesses 70d are also provided and define cavities in which scrap portions of the parison are formed.

Each first mold half 63a is provided with a plurality of blow pins 68. After the mold halves 63a and 63b engage, a pressurized fluid, air in the illustrated embodiment, is passed through two of the blow pins 68 into the parison 70 to blow the parison 70 against the mold halves 63a and 63b to form a part. A cooling fluid is circulated through the mold halves 63a and 63b to cool the blown part. After the part has cooled, the mold halves 63a and 63b are disengaged to release the finished part.

The resultant part will have upper, lower and central portions. The upper and central portions are formed in one of the first, second and third cavities 64a–64c. The lower portion is formed in the cavity defined by opposing recesses 70d. After the part has been blown and cooled, the upper and lower portions are removed and discarded. This leaves the central portion, which is shaped like a bottle. Of course, the inner cavities 64a–64c can be defined to form parts having different shapes.

In the illustrated embodiment, each of the mold halves 63a and 63b is provided with openings 69 through which a vacuum is drawn via conventional vacuum means (not shown). A label (not shown) can be held in place within one of the mold halves 63a and 63b via a vacuum for subsequent securement via adhesive to a parison 70 during the blowing portion of the process.

Having described the invention in detail and by reference to preferred embodiments thereof, it will be apparent that modifications and variations are possible without departing from the scope of the invention defined in the appended claims. For example, it is further contemplated by the present invention that a conventional radial or book closing blow molding displacement system could be employed to move the first and second mold halves of the blow molds into and out of engagement with one another.

What is claimed is:

1. A blow molding apparatus comprising:

a blow mold having first and second blow mold halves which are engageable and disengageable with one another, said first and second blow mold halves defining first and second inner cavities when said mold halves are engaged, said first cavity having a first shape and said second cavity having a second shape which differs from said first shape;

first and second displacement mechanisms connected respectively to said first and second mold halves for moving said first and second mold halves into and out of engagement with one another;

an extrusion apparatus having a die head through which a parison is extruded;

a locator mechanism connected with one of said blow mold and said extrusion apparatus for changing the positioning between said blow mold and said die head to allow capture of an extruded parison by said blow mold within a desired one of said first and second inner cavities such that said extruded parison can be formed into an article having substantially the same shape as said desired one of said first and second inner cavities;

said blow mold halves having opposing portions which engage and clamp off a portion of the captured parison when said mold halves are engaged; and a blow pin extending through an orifice in one of said first and second mold halves for passing pressurized fluid into the interior of said parison to blow said parison against said first and second mold halves to form said article.

2. A blow molding apparatus as set forth in claim 1, wherein said locator mechanism is connected to said extrusion apparatus for moving said die head relative to said blow mold.

3. A blow molding apparatus as set forth in claim 1, wherein said locator mechanism is connected to said blow mold for moving said blow mold relative to said die head.

4. A blow molding apparatus as set forth in claim 1, wherein said locator mechanism comprises a motor-driven screw mechanism.

5. A blow molding apparatus as set forth in claim 1, further comprising a sensor for determining when said die head is positioned adjacent to one of first and second locations on said blow mold, said blow mold capturing said extruded parison within said first cavity when said die head is positioned adjacent to said first location and capturing said extruded parison within said second cavity when said die head is positioned adjacent to said second location.

6. A blow molding apparatus as set forth in claim 5, wherein said sensor comprises a position encoder.

7. A blow molding apparatus comprising:

a rotating blow molder wheel having a plurality of blow molds, each blow mold including first and second blow mold halves which are engageable and disengageable with one another, said first and second blow mold halves defining first and second inner cavities when said mold halves are engaged, said first cavity having a first shape and said second cavity having a second shape which differs from said first shape;

an extrusion apparatus having a die head for extruding a parison;

a locator mechanism connected with one of said blow molder wheel and said extrusion apparatus for changing the positioning between said blow molder wheel and said die head to permit one of said blow molds to capture an extruded parison within a desired one of its first and second inner cavities such that said extruded parison can be formed into an article having substantially the same shape as said one cavity;

said blow mold halves having opposing portions which engage and clamp off a portion of the captured parison when said mold halves are engaged; and a blow pin extending through an orifice in said one blow mold for passing pressurized fluid into the interior of said extruded parison to blow said parison against said first and second mold halves of said one blow mold to form said article.

8. A blow molding apparatus as set forth in claim 7, wherein said locator mechanism is connected to said extrusion apparatus for moving said die head relative to said blow molder wheel.

9. A blow molding apparatus as set forth in claim 7, wherein said locator mechanism is connected to said blow molder wheel for moving said blow molder wheel relative to said die head.

10. A blow molding apparatus as set forth in claim 7, wherein said locator mechanism comprises a motor-driven screw mechanism.

11. A blow molding apparatus as set forth in claim 7, further comprising a sensor for determining when said die head is positioned adjacent to one of first and second locations on said one blow mold, said one blow mold capturing said extruded parison within its first cavity when said die head is positioned adjacent to said first location and capturing said extruded parison within its second cavity when said die head is positioned adjacent to said second location.

12. A blow molding apparatus as set forth in claim 11, wherein said sensor comprises a position encoder.

13. A blow molding apparatus comprising:

a blow mold having first and second blow mold halves which are engageable and disengageable with one another, said first and second blow mold halves defining first and second inner cavities when said mold halves are engaged, said first cavity having a first shape of a first closed-end container and said second cavity having a second shape of a second closed-end container which differs from said first shape;

first and second displacement mechanisms connected respectively to said first and second mold halves for moving said first and second mold halves into and out of engagement with one another;

an extrusion apparatus having a die head through which a parison is extruded;

a locator mechanism connected with one of said blow mold and said extrusion apparatus for changing the positioning between said blow mold and said die head to allow capture of an extruded parison by said blow mold within a desired one of said first and second inner cavities such that said extruded parison can be formed into an article having substantially the same shape as said desired one of said first and second inner cavities;

said blow mold halves having opposing portions which engage and clamp off a portion of the captured parison when said mold halves are engaged; and, a blow pin extending through an orifice in one of said first and second mold halves for passing pressurized fluid into the interior of said parison to blow said parison against said first and second mold halves to form said article.

* * * * *